United States Patent
Quesnel

(10) Patent No.: US 6,895,210 B1
(45) Date of Patent: May 17, 2005

(54) SHEET TO SHEET, "ON THE FLY" ELECTRONIC SKEW CORRECTION

(75) Inventor: Lisbeth S. Quesnel, Pittsford, NY (US)

(73) Assignee: Xerox Corporation, Stamford, CT (US)

(*) Notice: Subject to any disclaimer, the term of this patent is extended or adjusted under 35 U.S.C. 154(b) by 3 days.

(21) Appl. No.: 10/760,989

(22) Filed: Jan. 20, 2004

(51) Int. Cl.⁷ .............................................. G03G 15/00
(52) U.S. Cl. ...................................... 399/395; 400/579
(58) Field of Search .............................. 400/579, 630; 271/228; 399/388, 394, 395, 396

(56) References Cited

U.S. PATENT DOCUMENTS

| | | | |
|---|---|---|---|
| 4,519,700 A | 5/1985 | Barker et al. | |
| 4,712,118 A | * 12/1987 | Seto et al. | 347/248 |
| 4,755,855 A | * 7/1988 | Watanabe | 399/86 |
| 4,814,792 A | * 3/1989 | Yamanobe et al. | 347/248 |
| 5,140,340 A | * 8/1992 | Stephenson | 347/177 |
| 5,273,274 A | 12/1993 | Thomson et al. | |
| 5,678,159 A | 10/1997 | Williams et al. | |
| 6,137,989 A | 10/2000 | Quesnel | |
| 6,168,153 B1 | 1/2001 | Richards et al. | |
| 6,173,952 B1 | 1/2001 | Richards et al. | |

* cited by examiner

Primary Examiner—Ren Yan
(74) Attorney, Agent, or Firm—William Henry, II

(57) ABSTRACT

A sheet to sheet electronic skew correction system measures the input skew of each incoming sheet "on-the-fly" with sensors and then adjusts the image electronically to match the skew of the particular sheet. Thus, the image placed on the sheet from a photoreceptor is square with the dimensions of the sheet since the image is an exact match with the skew orientation of the sheet.

13 Claims, 3 Drawing Sheets

SHEET TO SHEET, "ON THE FLY" ELECTRONIC SKEW CORRECTION

BACKGROUND OF THE INVENTION

This disclosure relates to media handling within a printing apparatus, and more particularly, to a calibration and diagnostic system for use within the paper path of a printing apparatus to determine media speed and skew.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the information areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet. Such an electrophotographic printing process is shown in U.S. Pat. No. 6,137,989, which is incorporated herein by reference.

Typically, in printing machines described above, it is necessary to place the image with some precision on each sheet. This requires the ability to register a sheet with respect to the transfer station. Sheet registration of the top edge or inboard to outboard edge of the print, can be achieved in several ways. Edge registration, such as with crossed rolls, registers the top edge of the sheet by moving the sheet in a diagonal direction so that it eventually contacts against a side registration edge. The sheet is then transported forward in the process direction by servomotors that bring the sheet to transfer at the right time and at the right velocity. Translating electronic registration schemes utilize two or three stepper motors, which deskew the lead edge and simultaneously register the top edge of the sheet and then deliver the sheet at the right velocity and right time to transfer. The most inexpensive registration method is stalled roll deskew, whereby the sheet lead edge travels into a non-moving or stalled roll nip. The body of the sheet continues to move forward, pushing the lead edge forward so that it aligns eventually with the nip. When the stalled nip is activated, such as by an elector-mechanical clutch, the lead edge of the sheet, now deskewed, moves forward, and the body follows naturally.

The cost of these three systems has been estimated at approximately several hundred dollars for crossed rolls with servo or the translating electronic registration system with stepper motors, and nearly one hundred dollars for the stalled roll registration system. The stalled roll registration system is by far the most economical and is also the most frequently used registration system in mid to low cost printer/copiers. The stalled roll registration system, however, does not correct for top edge misregistration.

U.S. Pat. No. 4,519,700 issued May 28, 1985 to Barker et al. describes a xerographic image transfer device in which copy sheets are sequentially aligned and position sensed before introduction to the image transfer zone. The position sensing is used to compare the copy sheet location with the position of the image panel on a moving phototconductor. The timing and velocity profile of the copy sheet drive after the position sensing is arranged so that the copy sheet arrives in registry with the image panel and at the same velocity.

A sheet feeding and lateral registration system is shown in U.S. Pat. No. 5,273,274 issued Dec. 28, 1993 that includes feed rollers for feeding sheets in a process direction and registration apparatus for registering each sheet in a direction laterally of the process direction. The registration apparatus includes a shifting system for laterally shifting a carriage on which the feed rollers are mounted. A single edge sensor is arranged to provide a signal on detecting the presence of a sheet, and a controller controls the lateral shifting system in response to that signal. The controller is operated such that if the sheet is not detected by the sensor on initial entry of the sheet into the feed rollers, then the shifting system is activated to move the feed rollers laterally towards the sensor until the sheet is detected by the sensor, whereupon the lateral movement is stopped. If the sheet is detected by the sensor on initial entry of the sheet into the system, then the shifting system is activated to move the feed rollers laterally away from the sensor until the sensor no longer detects the sheet, and then the shifting system is reverse activated to laterally move the feed rollers back towards the sensor until the sheet is again detected by the sensor.

U.S. Pat. No. 5,678,159 issued Oct. 14, 1997 to Williams et al. discloses a deskewing and registration device for an electrophotographic printing machine. A single set of sensors determines the position and skew of a sheet in a paper path and generate signals indicative thereof. A pair of independently driven nips forwards the sheet to a registration position in skew and at the proper time based on signals from a controller which interprets the position signals and generates the motor control signals. An additional set of sensors can be used at the registration positions to provide feedback for updating the control signals as wear or different substrates having different coefficients of friction are used.

An apparatus and method for correcting top edge sheet misregistration using a sensor array is disclosed in U.S. Pat. No. 6,137,989 issued Oct. 24, 2000 to Lisbeth S. Quesnel. An array sensor is placed in the paper path prior to transfer. A signal is generated indicating the position of the sheet. As a function of the signal, the print controller causes the image to be exposed and developed on the photoreceptor in alignment with the sheet position. The aligned image is then transferred to the sheet.

U.S. Pat. Nos. 6,168,153 B1 and 6,173,952 B1 issued Jan. 2, 2001 and Jan. 16, 2001, respectively, to Paul N. Richards et al. disclose a sheet handling system for correcting the skew and/or transverse position of sequential sheets, especially those moving in a process direction in a sheet transport of a reproduction apparatus. The system employs sensor arrays in deskewing and/or side registering sheets.

Some of these technologies are quite sophisticated, utilizing various embedded sensors, digitally controllable stepper motors and high speed computational capability, all of which add up to a significant level of equipment cost, which, while justified in a high-end printer, might be considered exorbitant in a smaller, less expensive device.

Even though the above-mentioned prior art is useful, there is still a need, in printer/copiers for a more cost-effective paper path skew correction system.

Accordingly, a sheet to sheet electronic skew correction system is disclosed that answers the above-mentioned problem by measuring the input skew of each incoming sheet "on-the-fly" with sensors and then adjusting the image electronically to match the skew of the particular sheet. Thus, the image placed on the sheet from the photoreceptor is square with the dimensions of the sheet since the image is an exact match with the skew orientation of the sheet. The sheet can then be transported by a final nip that corrects only the lead edge timing.

BRIEF DESCRIPTION OF THE DRAWINGS

The foregoing and other features of the disclosure will be apparent and easily understood from a further reading of the specification, claims and by reference to the accompanying drawings in which like reference numerals refer to like elements and wherein:

Figure 1:
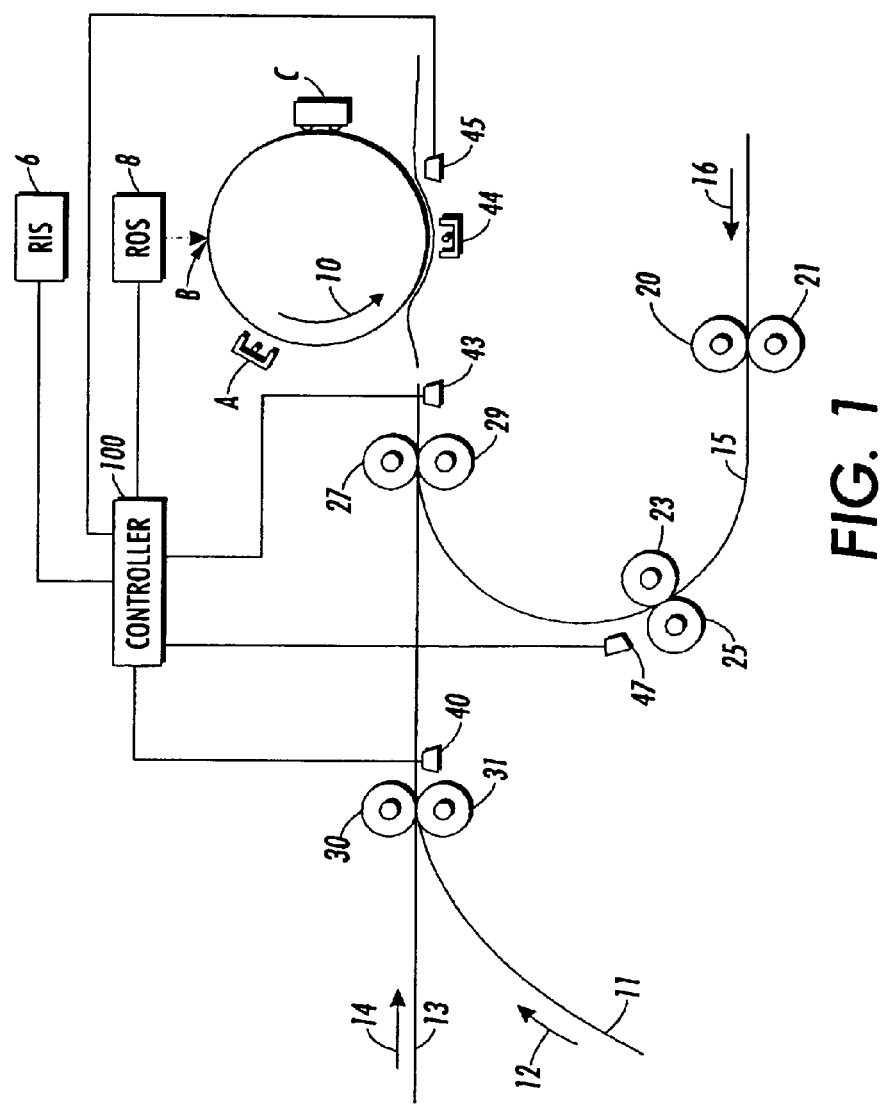
FIG. 1 is a partial schematic elevational view of a typical electrophotographic printing machine that includes a paper path calibration and diagnostic system.

While the disclosure will be described hereinafter in connection with a preferred embodiment thereof, it will be understood that limiting the disclosure to that embodiment is not intended. On the contrary, it is intended to cover all alternatives, modifications and equivalents as may be included within the spirit and scope of the invention as defined by the appended claims.

DETAILED DESCRIPTION OF THE INVENTION

The disclosure will now be described by reference to a preferred embodiment of the electronic paper path skew correction system of a printing machine. However, it should be understood that the disclosed electronic paper path correction system could be used with any machine in which paper skew is a problem.

For a general understanding of the features of the disclosure, reference is made to the drawings. In the drawings, like reference numerals have been used throughout to identify identical elements.

Referring to FIG. 1, a raster input scanner (RIS) 6 contains document illumination lamps, optics, a mechanical scanning drive and a charge couple device array. The RIS captures an entire original document and converts it to a series of raster scan lines. This information is transmitted to an electronic subsystem which controls a raster output scanner 8 described below. The image signals transmitted to the electronic subsystem may originate from a RIS as described above or from a computer, thereby enabling the electrophotographic printing machine to serve as a remotely located printer for one or more computers.

FIG. 1 schematically illustrates an electrophotographic printing machine which generally employs a drum 17 having a photoconductive surface 18 adhering to a conductive substrate. Preferably, photoconductive surface 10 comprises a selenium alloy with the conductive substrate being an electrically grounded aluminum alloy. Drum 17 moves in the direction of arrow 10 to advance successive portions of photoconductive surface 18 sequentially through the various conventional processing stations disposed about the path of movement thereof, including a charging station A, an exposure station B, represented by ROS 8, a developing station C, a transfer station 44, and a fusing station and a cleaning station (not shown) that function as shown in U.S. Pat. No. 4,823,102 which is incorporated herein by reference.

Initially, a sheet is fed by conventional means along simplex path 11 in the direction of arrow 12 towards a nip provided between drive roll 30 and idler roll 31. Drive roll 30 and idler roll 31 convey the sheet past a registration skew sensor pair, which is represented by 40 in FIG. 1. The sensor pair 40 is connected to controller 100 and adapted to send signals representing skew of the sheet to the controller based on the presence of absence of a sheet thereunder and its orientation. The sheet is then driven into a drive nip formed between registration rolls 27 and 29. Rotation of these rolls will drive the sheet past an optional pre-transfer skew sensor pair 43 and between a transfer station 44 and photoconductive surface 18, at which point an image is transferred to the sheet. Before an image is placed onto the photoreceptor, controller 100 purposely skews the image in accordance with the skew signals received from skew sensor pair 40 and optionally from pre-transfer skew sensor pair 43. Optionally, post transfer skew sensors could be used, if desired. As a consequence, the image placed on the sheet is in exact alignment with all four edges of the sheet. If duplexing of the sheet is required, the sheet is transported along path 15 in the direction of arrow 16 and driven by nips formed between drive rolls 20 and 23 and idler rolls 21 and 25, respectively. A duplex registration skew sensor pair 47 senses the sheet and sends a skew signal to controller 100 as the sheet is transported to registration rolls 27 and 29. Sheet input could also come from a multi-sheet inserter along path 13 in the direction of arrow 14, if desired.

The various machine functions are regulated by controller 100. The controller is preferably a programmable microprocessor that controls all of the machine functions hereinbefore described. The controller provides a comparison count of the copy sheets, the number of documents being recirculated, the number of documents being recirculated, the number of copy sheets selected by the operator, time delays, jam corrections, receive signals from full width array sensors and calculate skew in sheets passing over the sensors, calculate the change in skew, the speed of the sheet and an overall comparison of the detected motion of sheets with a reference or nominal motion through a particular portion of the machine.

The distance and time from transfer of the registration sensors in the simplex path and of the registration sensors in the duplex path are less than the distance and time of the image on the photoconductive surface from transfer. Therefore, in this type of machine architecture, "on-the-fly" electronic correction can be done for simplex skew and duplex skew, for each image that is placed on the drum. Each incoming skew is measured, the appropriate matrix transform is applied, and finally the "custom skewed" image is laid down onto photoconductive surface 18. In essence, the image is purposely skewed on drum 17. It is then developed and transferred to the incoming sheet. The resultant image on the sheet is not skewed.

Figure 3:
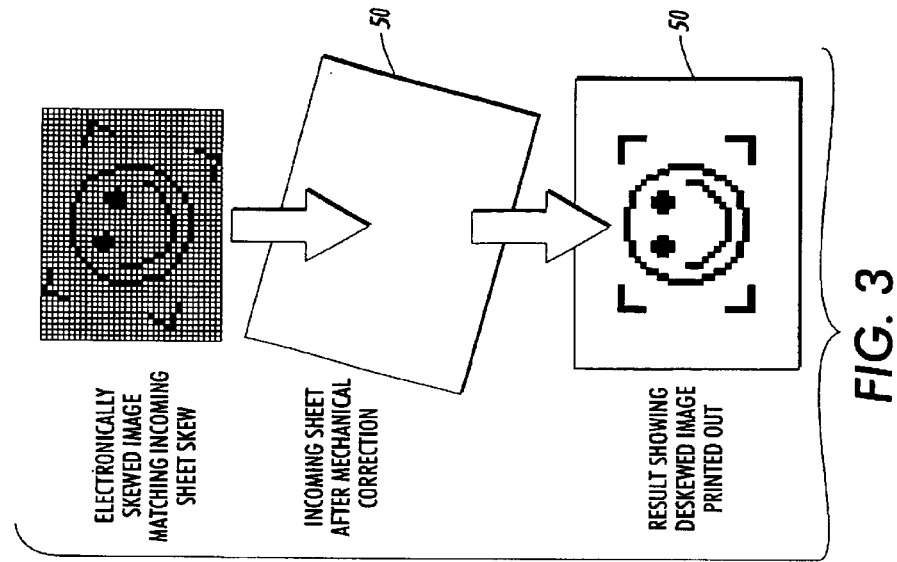
FIG. 3 is a partial plan diagram of the paper path of the electrophotographic printing machine of FIG. 1 showing an electronically skewed image matching the initial skew of an incoming sheet resulting in a deskewed image on the sheet being printed out.
Figure 2:
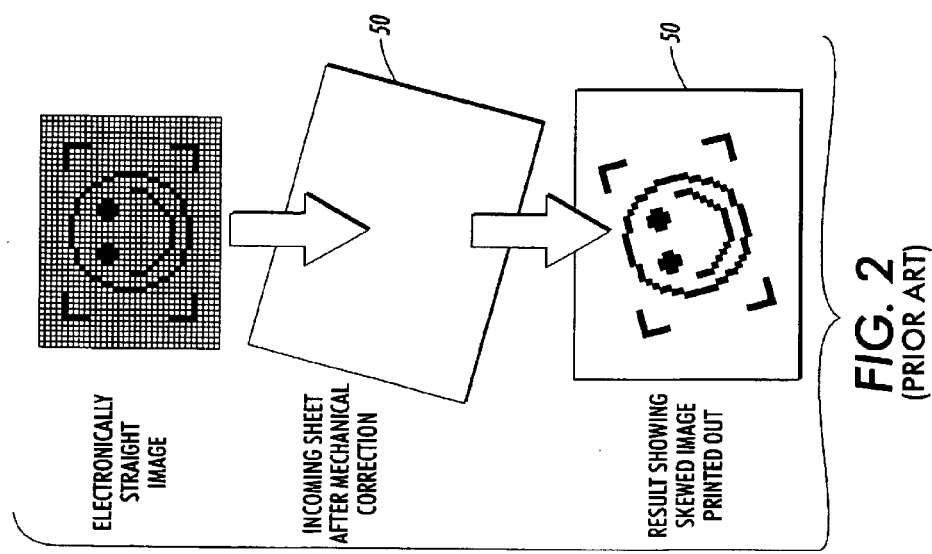
FIG. 2 is a schematic partial plan view of a portion of the paper path of a prior art printer showing an electronically straight image placed onto a skewed sheet with a resultant skewed image.

As shown in FIG. 2, conventionally, an image is shown electronically straight as it comes into contact with a sheet that has been mechanically corrected for skew. However, any skew not taken out of the sheet will result in the image on the sheet not being in perfect alignment with all edges of the sheet. In FIG. 3, an electronic image is skewed to match the incoming sheet's skew, and as a result, a deskewed image is laid down onto the sheet. In FIGS. 2 and 3, the amount of skew shown is exaggerated for illustration purposes.

Figure 4:
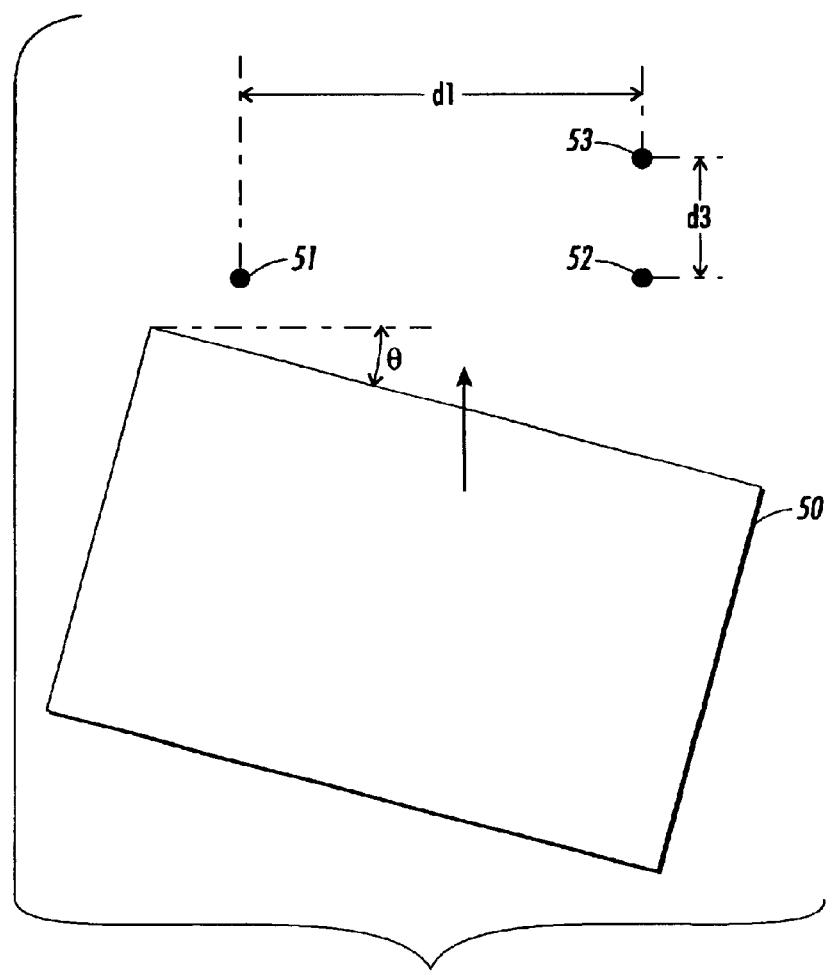
FIG. 4 is a plan view showing placement of skew sensors along the paper path used in FIG. 1.

With reference to FIG. 4, the skew sensors discussed hereinabove are inexpensive point sensors, typically measuring 3.5 or 5.0 volts when there is no sheet is present, and 0 volts when a sheet is present. The point sensor pairs can be mounted on the same piece of hardware with a fixed distance between them. The distance is used to determine the skew, in the following standard method:

Sensors 51 and 52 are used to measure skew.

Sensors 52 and optional sensor 53 are used to measure velocity.

The illustrated incoming sheet 50 will trip sensor 51 first, and at time t1.

The following equation is then used to determine sheet skew:

The small angle equation is:

$$\text{angle } \theta \text{ (in radians)} = [d3*(t2-t1)]/[d1*(t3-t2)]$$

where
t1 is the time sensor 51 is tripped,
t2 is the time sensor 52 is tripped,
t3 is the time sensor 53 is tripped, and
distances d1 and d3 are as shown in FIG. 4.

The image placed on the photoreceptor drum is then skewed by the exact same angle $\theta$ in order to match the sheet input skew, as shown in FIG. 3. Sensors can also be used to determine the location of the inboard—outboard edge of the sheet (top edge) and at the same time the "on-the-fly" skew is corrected, the top edge skew can also be corrected electronically.

"On-the-fly" electronic deskew enables easy evolution into higher productivity (higher speed) machines from one family of machines, without major hardware modifications. Furthermore, leaving some residual skew in the sheets as they enter the fuser nip reduces the impact force and thus motion quality perturbations exhibited particularly by heavyweight papers which have been mechanically deskewed. This is an additional advantage of the "on-the-fly" electronic deskew method.

It should now be understood that sheet to sheet, "on-the-fly," electronic skew correction method and apparatus has been disclosed that includes using sensor pairs to measuring the skew of each incoming sheet and sending a signal of the same to a controller which in turn rotates and electronic image to match the skew correction received from the sensors before the an image is placed onto a photoconductive surface. The resultant image that is place onto the transported sheet is registered with the skew of the sheet. Adjustments to the algorithm can be made, using sensor data from the post transfer skew sensors and/or pre-transfer skew sensors. Combining the information from these two sequential sets of sensors, knowing the distances from each pair of sensors, and using extrapolation, the image skew adjustment is "fine tuned" for later sheets. Accuracy could also be increased if sheet properties, such as, size, thickness, etc. are also known.

While specific embodiments have been outlined above, it is evident that many alternatives, modifications and variations will be apparent to those skilled in the art. Accordingly, the preferred embodiments as set forth hereinabove are intended to be illustrative and not limiting. Various changes may be made without departing from the spirit and scope of the invention as defined herein.

What is claimed is:

1. A system for correctly matching images to the skew of sheets transported through a paper path of a printer, comprising:

at least one pair of registration skew sensors adapted to generate signals representative of skew of a sheet passing thereunder;

a controller adapted to receive the signals from said at least one pair of registration skew sensors and generate a skewed print signal as a function thereof; and a photoconductive surface, and wherein said controller causes a skewed image to be placed onto said photoconductive surface that matches the skewed image signals received from said at least one pair of registration skew sensors, whereby the image transferred to the skewed sheet is properly aligned with the skew of the sheet.

2. The system of claim 1, including a pair of pre-transfer skew sensors.

3. The system of claim 2, including a pair of post transfer skew sensors.

4. The system of claim 1, including a pair of duplex registration sensors.

5. An electrophotographic printing machine including an apparatus for properly registering an image onto a skewed sheet, comprising:

at least one pair of registration skew sensors adapted to generate signals representative of skew of a sheet passing thereunder;

a photoconductive surface adapted to receive images thereon; and a controller adapted to receive said signals from said at least one pair of registration skew sensors and generate a skewed print signal as a function thereof, and wherein said controller causes a skewed image to be placed onto said photoconductive surface and thereafter transferred to the skewed sheet that matches the skewed image signals received from said at least one pair of registration skew sensors.

6. The electrophotographic printing machine of claim 5, including a pair of pre-transfer skew sensors.

7. The electrophotographic printing machine of claim 6, including a pair of post transfer skew sensors.

8. The electrophotographic printing machine of claim 5, including a pair of duplex registration sensors.

9. A method for electronically skewing an image to match the skew in a copy sheet transported in a printer, comprising;

providing at least one pair of registration skew sensors adapted to generate signals representative of skew of a sheet passing thereunder;

providing at least one sensor for use in measuring the velocity of a sheet passing thereunder;

determining the skew of the sheet passing under said registration skew sensors and said at least one sensor;

providing a photoconductive surface adapted to receive images thereon; and providing a controller adapted to receive said signals from said at least one pair of registration skew sensors and electronically skewing an image to thereby causes a skewed image to be placed onto said photoconductive surface that matches the skewed image signals received from said at least one pair of registration skew sensors.

10. The method of claim 9, including the step of transferring the skewed image to a copy sheet.

11. The method of claim 10, including the step of providing a pair of pre-transfer skew sensors.

12. The method of claim 11, including the step of providing a pair of post transfer skew sensors.

13. The method of claim 9, including the step of providing a pair of duplex registration sensors.

* * * * *